July 1, 1969
H. N. WHITE, JR
3,452,680
HYDRAULIC MOTOR-PUMP ASSEMBLY
Filed Aug. 11, 1967
Sheet 1 of 3
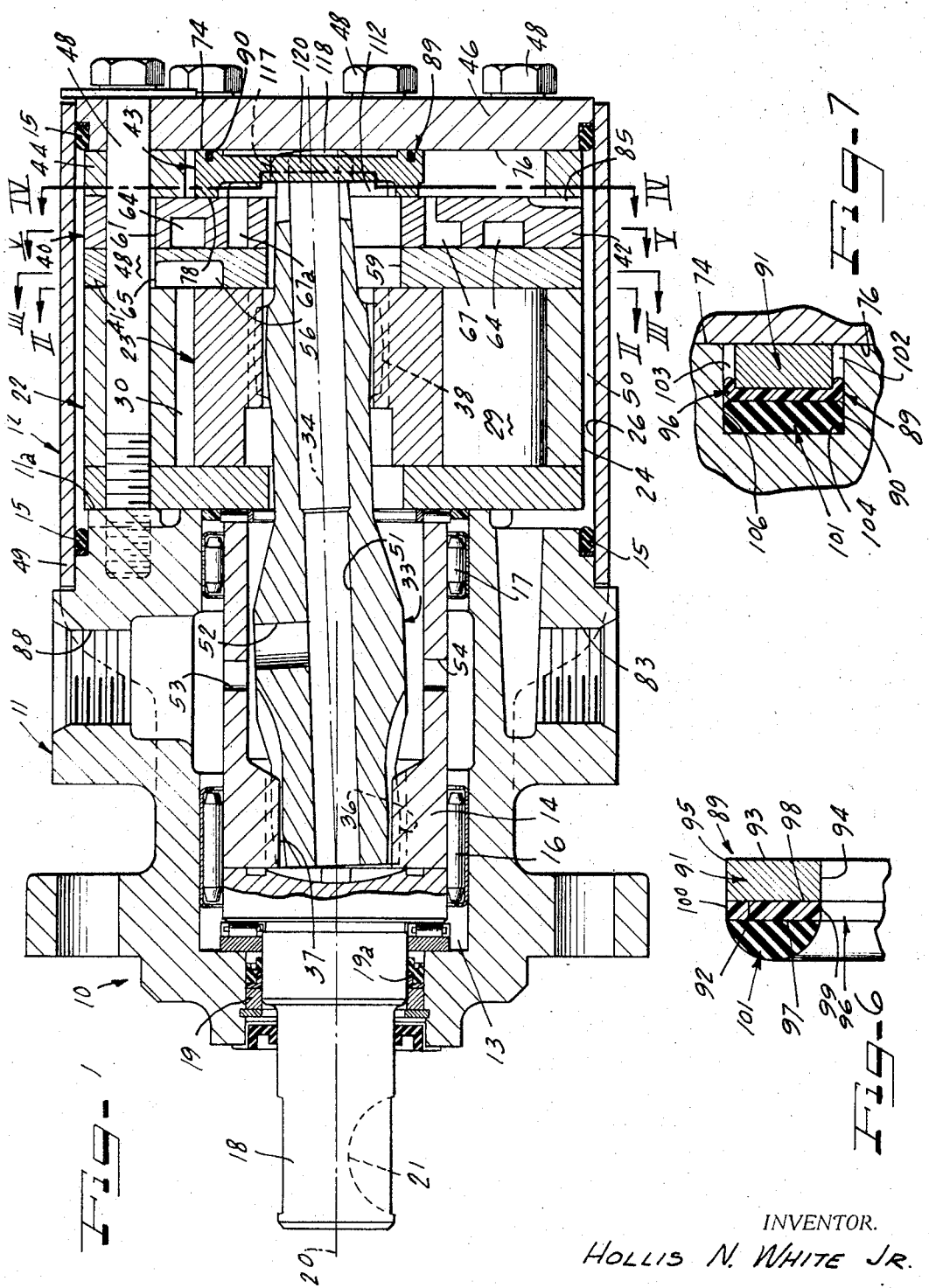
INVENTOR.
HOLLIS N. WHITE JR.
ATTORNEYS

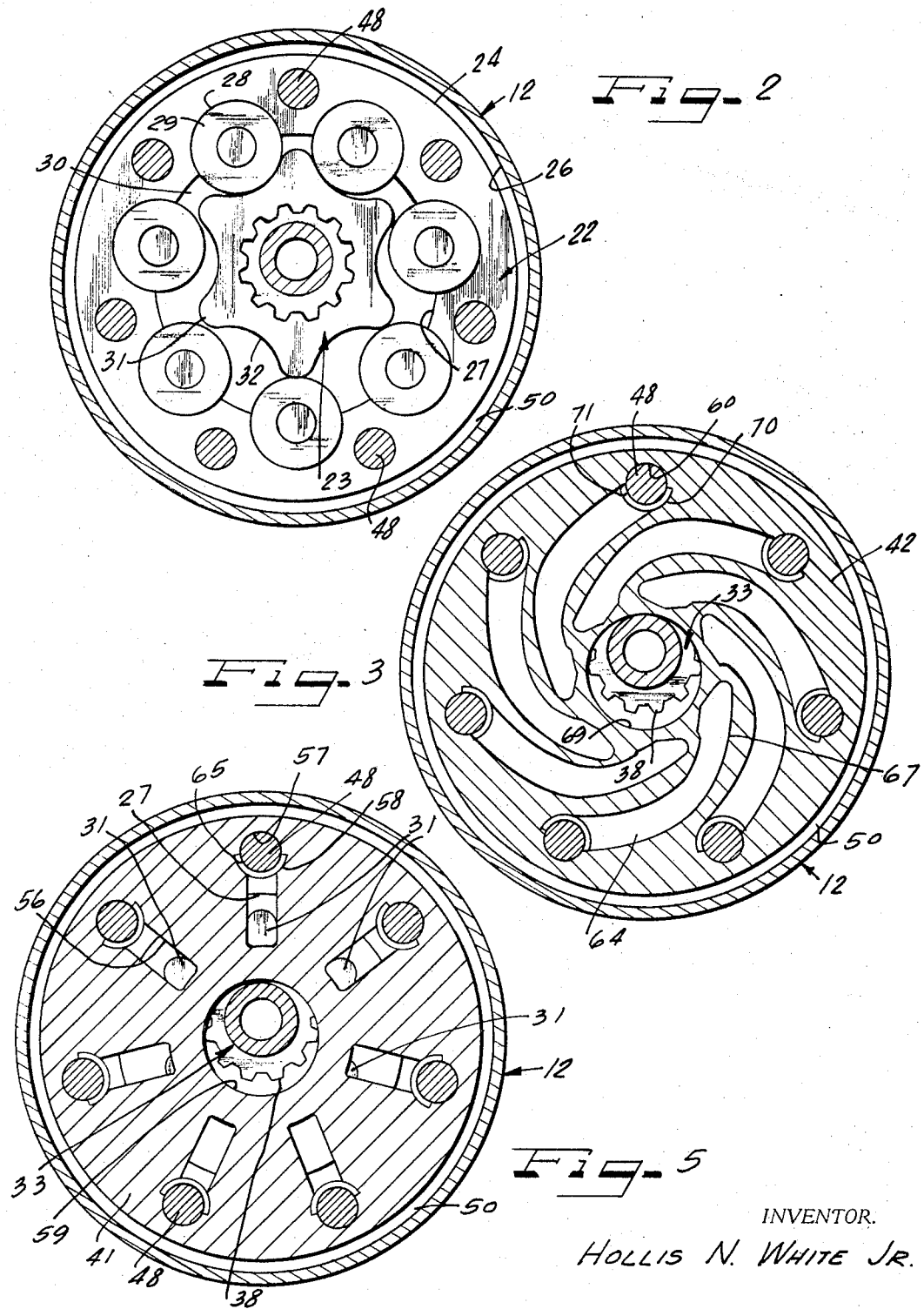

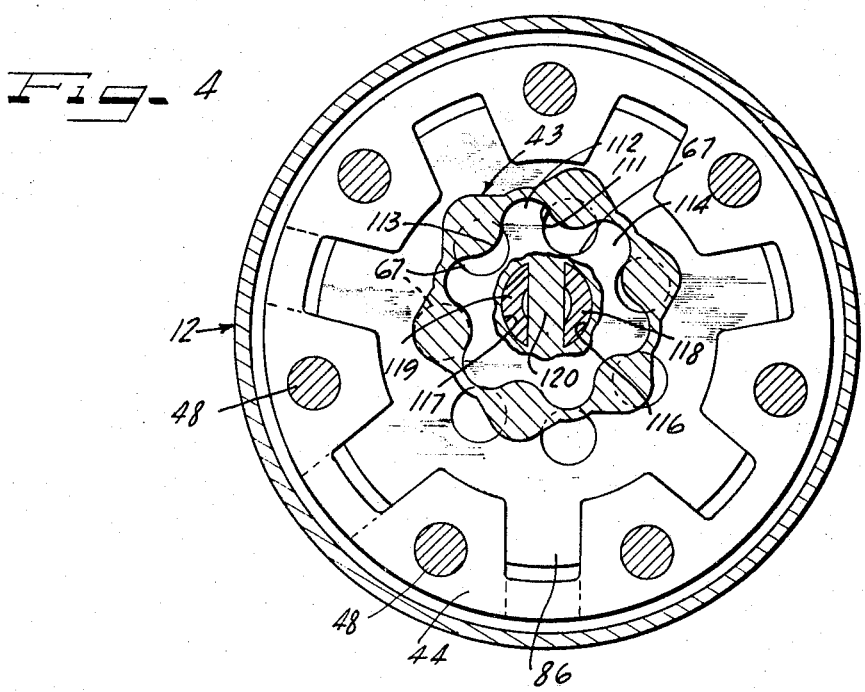
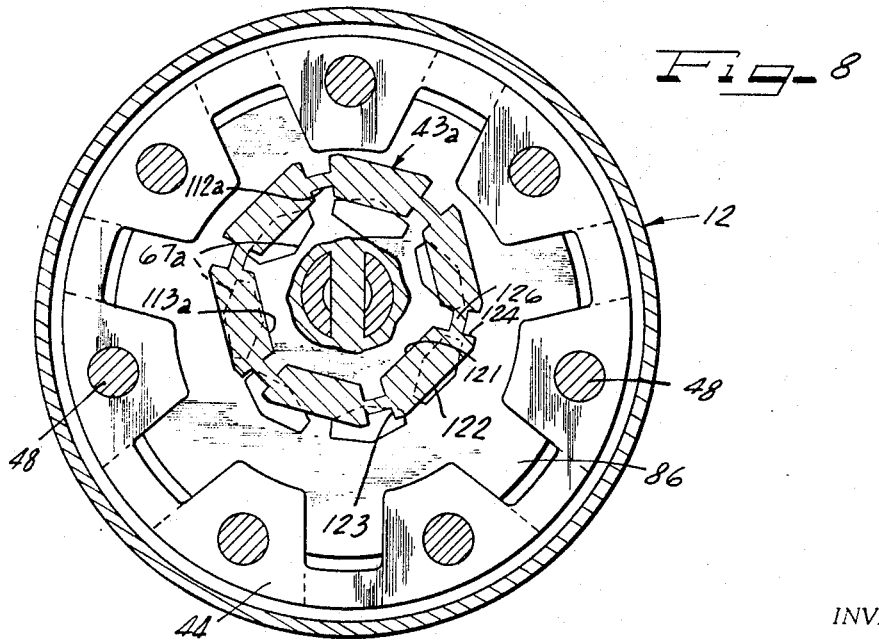

United States Patent Office 3,452,680
Patented July 1, 1969

3,452,680
HYDRAULIC MOTOR-PUMP ASSEMBLY
Hollis N. White, Jr., Lafayette, Ind., assignor to TRW Inc., Cleveland, Ohio, a corporation of Ohio
Filed Aug. 11, 1967, Ser. No. 659,994
Int. Cl. F04c *1/06*; F01c *1/10*
U.S. Cl. 103—130
20 Claims

ABSTRACT OF THE DISCLOSURE

A hydraulic device of the type having inner and outer lobed members of a gerotor gear set which rotate and gyrate through an orbit cycle to provide expanding and contracting pumping chambers. A generally disk-shaped commutator valve is provided with drive keys mating with the extension of a wobble stick, thereby to orbit and rotate in synchronism with the gear set. The valve has a valving surface controlling the ports in a manifold plate. The valve surface is notched or otherwise irregularly configured to relieve the flow passage and augment the flow for the pumping chambers which are more rapidly expanding and contracting. A fluid seal is provided on a face of the commutating valve in sliding engagement with the adjoining face of the housing, thereby to prevent leakage between the surfaces.

BACKGROUND OF THE INVENTION

This invention relates generally to motor-pump devices of the expanding-contracting chamber type and more particularly relates to pump-motor units having gerotor gear sets.

The prior art is exemplified by White, Jr. et al. 3,288,-034 wherein is disclosed a motor-pump arrangement having a commutator valve plate rotatable at orbit speed on a fixed axis prescribed by a fixed pin-centered journal.

SUMMARY OF THE INVENTION

In accordance with the present invention, a valving system for a positive displacement motor-pump unit of the type having intermeshed inner and outer teeth or lobes utilizes a commutator valve of plate or disk configuration and which is provided with a valving surface for commutating inlet and outlet flow on the face of the valve plate. Thus, the plate need not be pin-centered, but can be provided on a plate confined for orbital and rotational movement so that the surrounding chamber is not required to develop any flow controlling function. The valving surface is either notched or otherwise irregularly configured to augment flow to pumping chambers of the gerotor gear set as needed. For example, the commutating valve may comprise a disc of regular polygonal or modified hypo-cycloidal shape wherein the number of sides or lobes equals the number of teeth on the rotating gear member. To angularly index the valve, therefore, the valve plate is coupled by means of driving keys mating with the extension of a wobble stick drive similar to that embodied in my earlier acknowledged patent.

In addition, the commutator valve plate of the present invention is hydraulically balanced by virtue of balanced radial and axial hydraulic forces acting thereon.

One face of the commutator valve plate slidingly engages the face of a stationary wall member and is contemplated that a seal member be provided on the plate to prevent leakage of fluid between the engaged surfaces as the commutator valve orbits with respect to the stationary adjoining surface. More specifically, an annular groove is formed in the face of the valve plate and houses a continuous seal assembly to effectively partition radially spaced portions of the fact of the commutator valve.

BRIEF DESCRIPTION OF THE DRAWING

FIGURE 1 is a cross-sectional view of a hydraulic motor-pump assembly constructed in accordance with the principles of the present invention;

FIGURES 2–5 are sectional views taken on lines II—II; III—III, IV—IV and V—V, respectively, of FIGURE 1;

FIGURE 6 is an enlarged fragmentary cross-sectional view of a seal member embodied in the structure of the present invention;

FIGURE 7 is similar to FIGURE 6 but illustrates the seal member assembled in a groove formed in the face of the commutator valve plate and illustrates the shape of the components under actual operating conditions; and FIGURE 8 is a view similar to FIGURE 4, but showing an alternate configuration for the valving surface of the valve plate.

DESCRIPTION OF THE PREFERRED EMBODIMENT

Referring to FIGURES 1–5, a gerotor motor-pump unit constructed in accordance with the principles of the present invention is indicated generally at 10 and comprises a body or housing 11. A generally cylindrical shell or casing 12 extends axially to enclose a stack-up of parts retained in assembly with the body 11 by a plurality of bolts 48, each having threaded portions 49 received in correspondingly threaded circumferentially spaced openings formed in a radial face 11a of the housing 11. A cover plate 46 closes the assembly. A pair of O-ring members 15, 15 form a seal between the shell 12 and the body 11 and the cover 46, respectively.

A pair of fluid displacement members of a gerotor gear set is provided at 22 and 23 in order to form contracting and expanding fluid pockets or pumping chambers. Such members may be more specifically referred to as an internally lobed stator 22 and an externally lobed star or rotor 23, respectively. As shown in FIGURES 1 and 2, the stator 22 comprises a cylindrical member having a peripheral wall 24 spaced radially inwardly of an inner wall 26 of the shell or casing 12.

The stator 22 is centrally apertured to provide an inner wall 27 in which are formed in circumferentially spaced relation a series of axially extending recesses 28, each of which houses a cylindrical vane member 29, which together with one another form the internal lobes of the stator 22. The spaces 30 located between the lobes 29 comprise fluid pockets or chambers which continually alternately expand and contract as the rotor 23 rotates to admit or exit fluid therefrom.

The rotor 23 is star-shaped in radial cross-section and comprises a plurality of lobes 31 which in number equal one less than the number of lobes 29 of the stator 22. Outer wall sections 32 which interconnect pairs of adjacent lobes 31 are shaped to generally correspond with the outer surfaces of the lobes 29.

The axis of the rotor 23 is offset with respect to the axis of the stator 22 such that movement of the rotor 23 with respect to the stator 22 is essentially hypocycloidal, that is, possessing both rotary and orbital components, as will be understood by those skilled in the art.

The rotor 23 is rotatably interconnected with the drive sleeve 14 by means of an amplifying shaft part or wobble shaft 33 which has an axis of rotation indicated at 34 and which is disposed at an angle to the axis of the input-output shaft 18.

The wobble stick or shaft 33 is splined at one point 36 thereof to a complementally splined bore 37 of the drive sleeve 14 for corotation and is also splined as at 38 to a bore 39 of the rotor 23. The splines 36 and 38 on the wobble shaft 33 are curved slightly to afford limited universal pivotal movement of the shaft 33 with respect to the drive sleeve 14 and the rotor 23.

In order to direct to and from the fluid pockets 30 in timed relation to the orbital and rotating movement of the rotor 23, with respect to the stator 22, the unit 10 includes a commutation valving arrangement indicated generally at 40. More specifically, the arrangement 40 comprises a pair of stationary valve plates 41 and 42 which may be referred to, respectively, as an intermediate plate 41 and a manifold plate 42.

The commutation valving arrangement further includes a movable commutator valve plate shown generally at 43 and which is radially surrounded by the plate 44 situated between a cover plate 46 and the manifold plate 42. The plate 41 is situated between the stator and rotor 22 and 23 at one of the adjacent ends thereof and the manifold plate 42. A clamping plate 47 is disposed at the opposite adjacent ends of the stator 22 and the rotor 23 and plates 41, 42, 44 and 47 are clamped in stationary assembled relation by means of a plurality of threaded clamping bolts 48 which extend through registered bores formed in the respective plates and which are threaded into the body 11 of the unit 10, as indicated at 49.

The plates 41, 42, 44 and 47 are circularly shaped in vertical cross-section and have diameters equal to the diameter of the outer wall 24 of the stator 22, thereby providing an axially extending annular fluid flow passageway 50 along the inside wall 26 of the casing 12 between the plates 47 and 44. Other flow passageways are provided in the bores 51 and 52 formed in the wobble shaft 33 and in the bores 53 and 54 formed in the drive sleeve 14.

Referring to FIGURE 5, it will be noted the stationary plate 41 situated immediately adjacent the stator 22 has formed therein a plurality of radial flow passageways 56 extending axially therethrough. The passageways 56 correspond in number to the number of fluid chambers 30 formed between the lobes 29 and the stator 22, as well as to the number of clamping bolts 48 which extend axially therethrough and a corresponding number of circumferentially spaced bolt-receiving axial bores 57. Each of the passageways 56 openly communicates with its corresponding bore 57 and each of the bores 57 is oversized at a radially inner segment as indicated at 58. The plate 41 is also centrally apertured as at 59 to receive the wobble shaft 33, a forward or nose portion 60 of which forms a bifurcated extension having coupling portions 60a and 60b which cooperate with corresponding keyways 61a and 61b formed in the commutator valve plate 43.

The passageways 56 formed in the plate 41 extend radially inwardly of the inner wall 27 of the stator 22 so that the pockets or fluid chambers 30 formed between the lobe 29 of the stator 22 are in open fluid communication therewith.

Referring to FIGURE 3, the manifold plate 42 also has a series of circumferentially spaced axial bores formed therein to receive the shanks of the clamping bolts 48, such bores being indicated at 60. In addition, a plurality of dog-legged grooves 64 are formed in a radial face 66 and extend radially inwardly directed path from a corresponding bore 60 to a distal end 67 which communicates with an axial passage 67a of limited cross-sectional area to an opposite face 68 of the plate 42. The passages 67a are disposed in a circular pattern around a concentric bore 69 extending axially through the plate 42 to receive the wobble shaft 33. A radial inner portion 70 of each of the bores 60 is enlarged to provide an axial flow path surrounding a portion of the circumference of the clamping bolts 48, such flow passageway being indicated at 71 in FIGURE 1.

Referring to FIGURES 1 and 4, the commutator valve plate 43 comprises a disk-shaped article or plate and has a cylindrical peripheral wall 72 having a diameter substantially less than the diameter of an inner wall 74 of the plate 44 circumjacent thereto. One radial face 74 of the commutator valve 74 of the commutator valve plate 43 slidingly engages an adjoining inner radial wall 76 of the cover plate 46, while an opposite radial face 77 thereof slidingly engages an adjoining radial face 78 of the manifold plate 42.

In order to prevent leakage between the engaged faces of the commutator plate 43 and the cover plate 46, there is provided in accordance with the principles of the present invention a seal assembly mounted in the commutator valve plate 43 and indicated generally at 89.

As shown in FIGURE 4, the seal assembly 89 is annularly shaped and extends circumferentially continuously around the recess 79 and is disposed in an annular groove 90 formed in the face 74 of the commutator plate 43.

The seal assembly 89 comprises three elements constructed of different materials to perform distinct and different functions. The first element designated at 91 comprises a wear element and is made of metal such as bronze, iron or similar materials having favorable wear characteristics in a bearing assembly.

As shown in FIGURES 6 and 7, the metal element 91 is rectangularly shaped in cross-section and has spaced parallel top and bottom walls 92 and 93 extending between spaced parallel side walls 94 and 95.

Inwardly thereof there is provided a sealing element 96 which in unstressed condition is rectangularly shaped in cross-section as shown in FIGURE 6, being provided with spaced parallel top and bottom walls 97 and 98 and spaced parallel side walls 99 and 100. The ceiling element 96 may conveniently comprise material having good sealing characteristics such as nylon or a fluorocarbon resin material such as a material known under the commercial trade name of "Teflon" or "K–F," or other similar fluorinated hydrocarbon material.

The third element identified as 101 is semi-circularly shaped in cross-section in the free state configuration thereof and has a diameter equal to the width of the wear element 91 and the sealing element 96. The element 101 is a biasing element and may be constituted of an elastomer, or some other material capable of exerting a continuous biasing force. The three elements 91, 96 and 101 may be fastened together in firm assembly by suitable means such as the provision of a bonding material or adhesive between the abutting surfaces thereof.

Referring to FIGURE 7, the width of the groove 90 is greater than the width of the wear member 91 and the overall depth of the groove 90 is less than the overall depth of the sealing assembly 89, including the wear element 91, the sealing element 96, and the biasing element 101. Thus, when the sealing assembly 89 is housed in the groove 90 in the assembled condition of the motor-pump unit 10, the wear element 91 is forced into the groove against the sealing element 96 and the biasing element 101. Such inward force flattens and deforms the elastomer 101 which, in turn, wraps the sides 99 and 100 of the sealing element 96 outwardly around the side walls 93 and 94 of the wear element 91 and into the spaces 102 and 103 between the side walls 93 and 94 of the wear element 91 and the side walls 104 and 106 of the groove 90. Thus, not only is the wear element 91 biased against the engaged face 76 of the cover plate 46, but the edges of the sealing element 96 are squeezed into snug sealing engagement between the adjacent walls of the wear element 91 and the groove 90.

In the form of the invention shown in FIGURE 4, the commutator valve plate 43 has the radial face 78 thereof recessed as at 111 to provide a recess having an outer peripheral wall configured in shape complementary to the configuration of the star or rotor 23. Accordingly, such wall 111 provides a plurality of circumferentially spaced pockets 112 and a corresponding plurality of radially inwardly extending protrusions 113. The axial wall 111 terminates in a radially extending surface 114.

Centrally disposed relative to the orientation of the commutator valve member 43 is a coupling means whereby the commutator valve 43 will rotate and orbit in synchronism with the rotor 23. The coupling means constitutes male and female parts which could be relatively reversed with respect to one another, however, in this illustrative embodiment, the commutator valve plate 43 has two crescent-shaped axial openings 116 and 117, respectively. The wobble stick 33 has a corresponding pair of fingers provided by a bifurcated extension. Thus, there is provided a first finger 118 and a second finger 119. A bridging portion 120 left in the commutator valve plate 43 between the crescent-shaped openings 116 and 117 fits in between the bifurcated extension, or, in other words between the fingers 118 and 119, thereby insuring co-rotation of the wobble stick 33 and the commutator valve plate 43. The relationship of the commutator valve plate 43 to the extended end of the wobble stick 33 insures orbital movement of the commutator valve plate 43 as the surface 78 opens and closes the ports 67 in the adjoining porting surface.

Note that in the form of the invention shown in FIGURE 4, each port 67 is circularly configured and is complemental in shape to corresponding circumferentially spaced circular portions in the control surface 78 linked together by reduced portions. Thus, using the orientation of FIGURE 4, it will be noted that the port 67 at the left-hand side of the drawing is completely closed while the other ports are shown in various degrees of open relation to either the outer peripheral surface of the commutator valve plate 43 or the wall 111.

In the form of the invention shown in FIGURE 8 the ports are shown at 67a. It will be noted that the ports are of generally rhomboidal configuration, being provided with converging side walls. The commutating valve member is shown generally at 43a and has a valve-controlled surface provided for opening and closing the ports 67a. While generally similar to the form of the invention provided in FIGURE 4 in that there is an irregular inner wall including outer portions 112a and inner portions 113a, it will be noted that the configuration of the control surface forming portion resembles in section a plurality of circumferentially spaced trapezoids linked together by reduced sections to provide a circumferentially continuous irregularly contoured porting surface. Thus, each trapezoid has inner and outer parallel portions 121 and 122, as well as end portions 123 and 124. The linking parts are shown at 126. Again, using the orientation of FIGURE 8, it will be noted that the port 67a at the left-hand side of the drawing is completely covered by one of the trapezoidal areas, while the other ports 67a are shown in various stages of opening, both with respect to the inner and outer portions of the porting area.

In both forms of the invention, the reduced sections afford a large open port area, thereby contributing to good flow characteristics through the ports and thereby reducing pressure drop across the ports. Rotation of the commutator valve 43 and 43a at orbit speed, however, insures that the reduced sections are properly indexed at all times so that none of the pumping medium will be short-circuited improperly.

It will be noted that the opposite face of the commutator valve plate 43 or 43a has a recess 79 formed therein which communicates via an axial bore 51 formed in the wobble shaft 33 with remote portions of the pumping device.

In operation, when the unit functions as a motor to rotatably drive the input-output shaft 18, a source of pressurized fluid is connected to an opening 83 formed in the body 11 from which it passes to a chamber 84 into the flow passageway 50 situated immediately interiorly of the wall 26 of the casing 12. The pressurized fluid then flows through the radially angularly spaced grooves 85 and 86 formed respectively in faces 68 and 77 of the plates 42 and 44 and into a chamber 87 surrounding the commutator valve plate 43 or 43a.

Regardless of the position of the commutator valve plate 43 or 43a, at least one of the flow passageways 67 or 67a formed in the manifold plate 42 communicates with the chamber 87 and directs the pressurized fluid through its respective dog-legged passageway 64 to the flow passageway 71 communicating therewith. The pressurized fluid is then communicated into the flow passageway 65 formed in the plate 41 in register with the pressurized passageway 71 and thence flows into a fluid chamber or pocket 30 formed between the lobes 29 of the stator 22.

Pressurization of one or more of the fluid chambers 30 in any position of the rotor 23 imparts a rotating force to the rotor in one direction of rotation, such direction being counterclockwise in FIGURE 2.

Each of the fluid chambers 30 in communication with the pressurized fluid expands in size because of the simultaneous orbital and rotational movement of the rotor 23, whereas the chambers 30 which are not in communication with the pressurized fluid, contract as the lobes 31 of the rotor 23 begin to move into the chambers 30 and express the fluid therefrom.

The fluid in the chambers 30 which are being reduced in size is directed through the radial passages 56 of the intermediate plate 41 corresponding to the contracting chambers and thence through the passageways 65 and 71 to the corresponding dog-legged passageway 64. The fluid then flows through the associated passages 67 formed at the distal ends of the corresponding passages 64 and thence through the recess 80 formed in the commutator plate 43, bores 82, 51 and 52 formed in the wobble shaft 33, and thence through passages 53 and 54 and the drive sleeve 14 and out of the body 11 through an opening 88 situated opposite the opening 83. As the rotor 23 rotates through an orbital path as a result of the successive pressurization of circumferentially adjacent fluid chambers 30, the wobble shaft 33 is also rotated and, along with the rotor 23, orbits at the orbit speed of the rotor. In the embodiment illustrated, the stator 22 has seven lobes, whereas the rotor 23 has six. Thus, for each revolution thereof, the rotor 23 will orbit six times. The wobble shaft 33 also orbits at the point 38 about the pivotal end or point 36 at the orbiting speed of the rotor 23.

Since the commutator plate 43 and 43a is coupled to the nose 60 of the wobble shaft 33, it will be orbited at the orbit speed of the rotor 23 and will be rotated as co-rotational speed with the wobble shaft 33.

The commutator valve plate 43 or 43a therefore alternately and sequentially opens and closes the radially angularly adjacent passageways 67 and 67a with the fluid pressurized chamber 87 as it orbits and rotates in timed relation to the orbital and rotational movement of the rotor 23, whereby the fluid pockets or chambers 30 sequentially and alternately expand under the driving force of the pressurized fluid and then contract to express the fluid therefrom.

Since the wobble shaft 33 is coupled to the work input-output shaft 18, it rotates the shaft 18 at the speed of rotation of the rotor 23. Operation of the unit 10 and rotation of the shaft 18 will continue as long as the opening 83 of the body 11 is connected to a source of pressurized fluid.

In order to reverse the direction of rotation of the shaft 18, it is only necessary to connect the opening 88 to the source of pressurized fluid rather than to the opening 83. The pressurized fluid will then flow through the gerotor unit 10 in a direction opposite to that described above, thereby causing the rotor 23 to rotate in a clockwise direction as viewed in FIGURE 2. When the unit 10 is utilized as a hydraulic pump, the shaft 18 is connected for rotation to any suitable driving motor and fluid will be pumped through the unit 10 between openings 83 and 88 in a direction which depends upon the direction of rotation of the shaft 18.

Although minor modifications might be suggested by

I claim:

1. A hydraulic device of the type having inner and outer lobed members hypocycloidally movable to provide expanding and contracting working chambers,
   porting means adjacent said working chambers and having a stationary porting surface,
   a movable commutator valve having a porting surface slidably engaging said stationary porting surface to control the flow of fluid into and out of said working chambers and through said stationary porting plate, and
   means supporting said valve for orbital and rotational movement in synchronism with said lobed members,
      said porting means being disposed between said lobed members and said commutator valve and having passages therein communicating with said working chambers.

2. A hydraulic device as defined in claim 1 and further characterized by
   said valve porting surface comprising an irregularly configured surface prescribed by a circumferentially continuous row of alternately disposed enlarged and reduced portions respectively larger and smaller than the corresponding ports in said stationary porting surface.

3. A hydraulic device as defined in claim 1 and further characterized by
   said means supporting said valve comprising a generally cylindrical chamber of larger size than said valve and of which said stationary porting surface is one radial wall, and
   a second radial wall is spaced axially therefrom in parallel relation with respect thereto.

4. A hydraulic device as defined in claim 1 and further characterized by
   means driving said valve in synchronous hypocycloidal movement with said lobed members.

5. A hydraulic device as defined in claim 4 wherein said last mentioned driving means comprises a wobble stick.

6. A hydraulic device as defined in claim 5 wherein said wobble stick has an extension and said valve is recessed so that said wobble stick and said valve together with one another form intermating driving keys affording synchronous rotation and orbital movement of said valve with respect to said lobed members.

7. A hydraulic device as defined in claim 3 and further characterized by
   sealing means between said second radial wall and the adjoining surface of said valve.

8. A hydraulic device as defined in claim 2 and further characterized by said irregularly configured surface having an inner wall complementary in shape to the configuration of the inner lobed member,
   said stationary porting surface having a row of circularly configured ports.

9. A hydraulic device of the type having inner and outer lobed members hypocycloidally movable to provide expanding and contracting working chambers,
   porting means adjacent said working chambers and having a stationary porting surface,
   a movable commutator valve having a porting surface slidably engaging said stationary porting surface to control the flow of fluid into and out of said working chambers and through said stationary porting surface, and
   means supporting said valve for orbital and rotational movement in synchronism with said lobed members,
      said valve porting surface comprising an irregularly configured surface prescribed by a circumferential row of alternately disposed enlarged and reduced portions respectively larger and smaller than the corresponding ports in said stationary porting surface,
   said irregularly configured surface having a series of rhomboidally shaped portions linked by intermediate reduced portions,
   said stationary porting surface having trapezoidally shaped ports formed therein.

10. A hydraulic motor-pump unit comprising cooperating internally and externally lobed fluid displacement members arranged for simultaneous relatively orbital and rotational movement upon rotation of one of the members to provide a series of successive alternately expanding and contracting fluid chambers therebetween,
    means for rotating said one of said members,
    commutating porting means for directing fluid flow to and from the fluid members,
    means forming guide means and supporting said commutating porting means for orbital and rotational movement,
    a wobble shaft operatively connected to the orbiting one of said members and having one portion thereof orbited thereby at the orbiting speed of said one member and rotatable in unison therewith and another portion only rotatable in unison therewith,
    means coupling said one portion of the wobble shaft with said commutating porting means to orbit and rotate said commutating porting means in unison with said one member.

11. A motor-pump unit as defined in claim 10 and further characterized by
    means forming a flat internal wall member therein and wherein said commutating porting means comprises a commutator having a flat wall portion in sliding engagement with said internal wall member,
    a continuous groove formed in the face of said flat wall portion and a continuous seal member in said groove for providing a fluid seal between said internal wall member and said flat wall portion.

12. A motor-pump unit as defined in claim 10 wherein said commutating porting means comprises
    a commutator having a flat wall portion,
    means forming a continuous groove in the face of said flat wall portion,
    continuous seal means in said groove, and
    a recess within said seal means providing a first fluid pressure chamber opening to the face of said flat wall portion, and including a flat internal wall member in face-to-face abutting and sliding engagement with the flat wall portion of said commutator, and
    means forming a second fluid pressure chamber opening to the abutting face of said flat internal wall member whereby said seal means provides a fluid seal between the abutting faces of the flat wall portion of the commutator and the flat internal wall member to reduce fluid leakage therepast and between the fluid pressure chambers.

13. A motor-pump unit as defined in claim 12 wherein said seal means comprises
    a laminated structure including a wear element protruding out of said groove and engageable with said flat internal wall member, and
    a sealing element behind said wear element and a biasing element behind said sealing element,
       said sealing and biasing elements being deformable from a free state configuration to an assembled state configuration, said sealing element being made of plastic and said biasing element being made of an elastomer.

14. A motor-pump unit as defined in claim 13 wherein said groove comprises
    a pair of flat parallel side walls spaced a apart a distance greater than the width of said wear element and the width of said sealing and biasing elements in the free state configuration thereof and wherein said sealing element is deformed in the assembled state configuration thereof so that it wraps outwardly around the sides of the wear element to fill the gap between the side walls of the groove and the sides of the wear element.

15. A hydraulic pump-motor device comprising
work input-output means rotatable on an axis,
fluid displacement means having inner and outer parts which rotate and orbit relative to one another about said axis,
an amplifying shaft part disposed at an angle with respect to said axis,
means universally pivotally and drivingly interconnecting said work input-output means and said shaft part at a first point on said shaft part,
means coupling said shaft part to one of said inner and outer parts at a second point on said shaft parts spaced from said first point, which second point orbits through a first orbital path relative to said axis, thereby orbiting said second point on said shaft part relative to said axis in unison with said one of said inner and outer parts, and
a commutating porting means for said inner and outer parts, coupled to a third point on said shaft part spaced from said second point, which third point orbits through a second orbital path relative to said axis,
the orbiting speeds of said second and third points being equal and the orbital paths of said second and third points differing as a function of the respective spacing of said second and third points from said first point,
whereby said commutating porting means is orbited at the orbiting speed of said second and third points.

16. The device as defined in claim 15 wherein said commutating porting means comprises a commutator plate, and including
wall means confining said commutator plate therebetween for rotational and orbital movement thereof only radially with respect to said axis.

17. In a hydraulic device having a disk-shaped commutating valve plate for covering and uncovering ports and having a face forming a surface for sliding and abutting engagement wtih adjoining casing surface, the improvement of
a seal assembly disposed in said face for engagement with the adjoining casing surface,
said seal assembly comprising a wear element, a sealing element, and
a biasing element behind said sealing element to continuously urged said wear element into sealing relation with the adjoining casing surface,
said wear element being made of metal, said sealing element being made of plastic and said biasing element being made of elastomer.

18. The hydraulic device as defined in claim 17 wherein said sealing element and said basing element are deformable from a free state to an assembled state configuration and including means forming a groove in said face of said commutator valve plate for receiving said seal assembly and comprising
a pair of flat parallel side walls spaced apart a distance greater than the width of said sealing and biasing elements in the free state thereof, and wherein said sealing element is deformed in the assembled state thereof so that it wraps outwardly around the sides of the wear element to fill the gap between the side walls of the groove and the sides of the wear element.

19. A hydraulic motor-pump unit comprising cooperating internally and externally lobed fluid displacement members arranged for simultaneous relatively orbital and rotational movement to provide a series of successively alternately expanding and contracting fluid chambers therebetween, means for rotating one of said members, means for directing fluid to and from the fluid chambers comprising
an axial disk-shaped commutator plate situated in spaced relation to said fluid displacement members and having a radial face facing said members,
driving means interconnecting the orbiting one of said members and said commutator plate for synchronous orbital and rotational movement therewith,
stationary plate means betwen said fluid displacement members and said commutator plate and having first and second radial faces in sliding and abutting engagement respectively with said radial face of said commutator plate and with said members,
cylindrical wall means surrounding said commutator plate in radially spaced relation,
means forming a porting surface on said commutator plate including means having inner and outer walls and a circumferentially extending porting surface,
fluid transfer means formed in said stationary plate means for successively controlling commutation of fluid to said fluid chambers and comprising,
a series of spaced elongated passages each having first and second ends opening respectively to said first and second radial faces of said stationary plate means,
said first openings arranged in a pattern disposed to be covered and uncovered by said porting surface as said commutator plate moves orbitally and rotationally,
said second openings communicating respectively with the fluid chambers between said fluid displacement members.

20. The hydraulic motor-pump unit as defined in claim 17 wherein said spaced elongated passages each extend in a curved and radially inwardly bent direction from said second to said first opening thereof.

References Cited
UNITED STATES PATENTS

| | | | |
|---|---|---|---|
| 2,879,042 | 4/1961 | Bentele. | |
| 3,224,421 | 12/1965 | Peras | 230—145 |
| 3,261,542 | 7/1966 | Jones. | |
| 3,288,034 | 11/1966 | White et al. | 91—56 |
| 3,309,011 | 3/1967 | Osakada et al. | |
| 3,316,814 | 5/1967 | Charlson | 103—130 |

WILLIAM L. FREEK, *Primary Examiner.*

W. L. GOODLIN, *Assistant Examiner.*

U.S. Cl. X.R.

103—126